(12) United States Patent
Donoghue

(10) Patent No.: US 6,882,622 B1
(45) Date of Patent: Apr. 19, 2005

(54) FLOW CONTROL SYSTEM FOR NETWORK DEVICES

(75) Inventor: Bryan J Donoghue, St Albans (GB)

(73) Assignee: 3Com Corporation, Santa Clara, CA (US)

(*) Notice: Subject to any disclaimer, the term of this patent is extended or adjusted under 35 U.S.C. 154(b) by 626 days.

(21) Appl. No.: 09/630,955

(22) Filed: Aug. 2, 2000

(30) Foreign Application Priority Data

Mar. 24, 2000 (GB) .............................................. 0007049

(51) Int. Cl.[7] .............................. H04J 1/16; H04J 3/14
(52) U.S. Cl. ....................... 370/229; 370/235; 370/412
(58) Field of Search ................................. 370/229, 230, 370/231, 232, 235, 276, 412

(56) References Cited

U.S. PATENT DOCUMENTS

| | | | | |
|---|---|---|---|---|
| 4,953,157 A | | 8/1990 | Franklin et al. | |
| 6,084,856 A | * | 7/2000 | Simmons et al. | 370/235 |
| 6,115,356 A | * | 9/2000 | Kalkunte et al. | 370/229 |
| 6,118,761 A | * | 9/2000 | Kalkunte et al. | 370/229 |
| 6,167,029 A | * | 12/2000 | Ramakrishnan | 370/235 |
| 6,222,825 B1 | * | 4/2001 | Mangin et al. | 370/235 |
| 6,295,281 B1 | * | 9/2001 | Itkowsky et al. | 370/293 |

* cited by examiner

Primary Examiner—Ajit Patel
Assistant Examiner—Chirag Shah
(74) Attorney, Agent, or Firm—Nixon & Vanderhye, P.C.

(57) ABSTRACT

A network device which includes means for receiving data packets over a link, a memory for the packets, means for providing an indication that the occupancy of the memory is less than a first watermark, and means responsive to the indication for providing a sequence of pause frames comprising an alternating sequence of XOFF frames defining a very long cessation of the sending of packets and XON frames defining substantially zero cessation of the sending of packets. The means for providing the pause frames is responsive to the increase of the occupancy of the memory above a selected watermark to cease the provision of the sequence of pause frames.

16 Claims, 5 Drawing Sheets

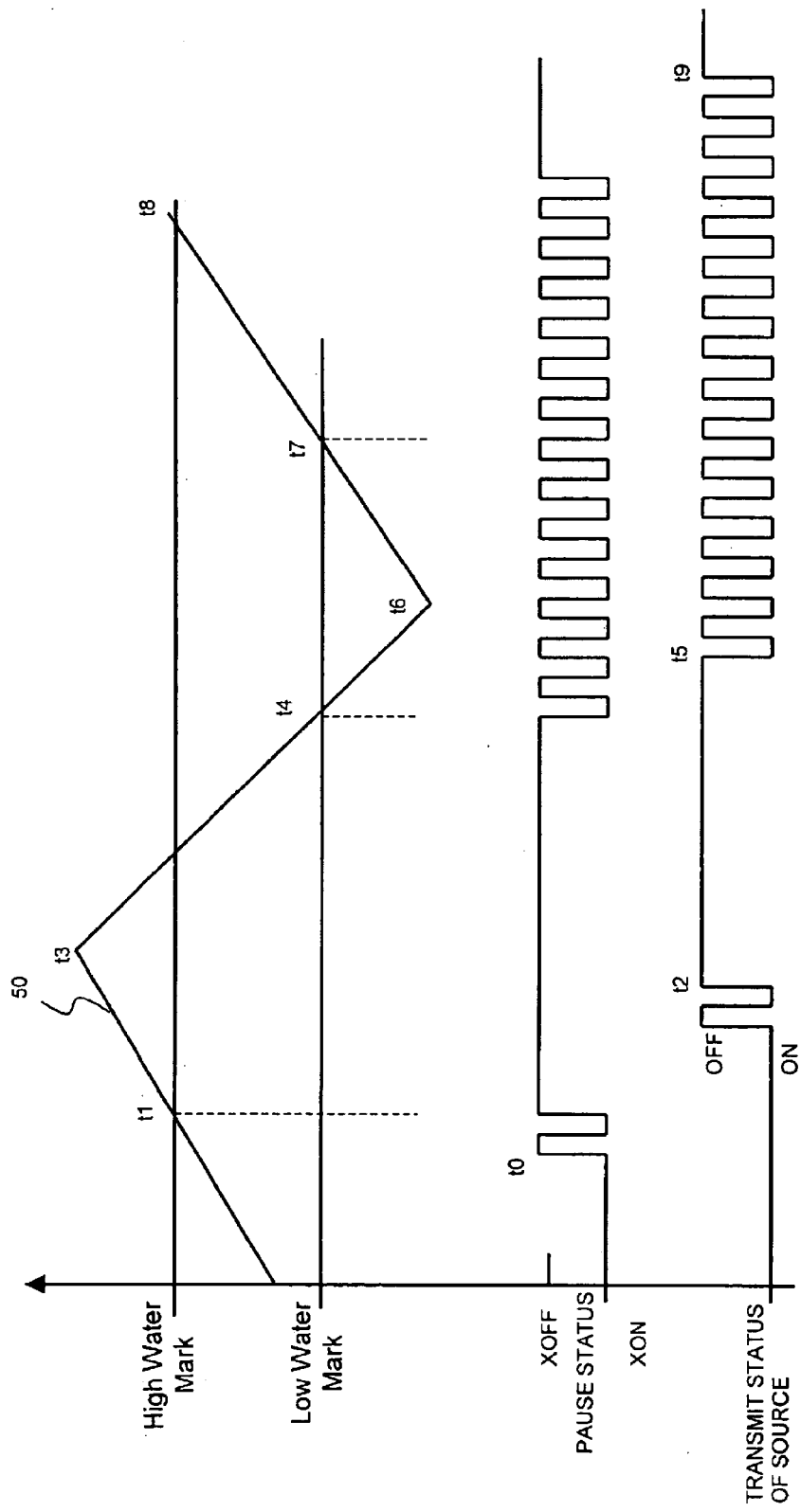

FLOW CONTROL SYSTEM FOR NETWORK DEVICES

FIELD OF THE INVENTION

This invention relates to flow control in packet-based communication networks and in particular to a flow control system for network devices capable of sending over a duplex link control frames hereinafter called pause frames specifying a selectable pause in the sending of packets by a source connected to the other end of the link. The invention particularly relates to the generation of special pause frames in a manner which is intended to reduce storage requirements in network devices such as switches.

BACKGROUND TO THE INVENTION

Packet-based communication systems such as Ethernet systems consist, in terms of hardware, of a multiplicity of links at each end of which two devices send addressed data packets to each other. In general, when a packet is received by a device the addressed data may (if necessary) be read to determine if required the next destination of the packet on its route to the ultimate end station. Typically the packet is temporarily stored. A packet may be stored in memory specifically dedicated to particular ports or may be stored in a common central memory. Typically, whether there is a common central memory or not, each port of a device has FIFO memory associated with it. Whatever may be the arrangements for the temporary storage of packets before they are forwarded from a given device, it is a normal occurrence that a device at one end of a link sends packets or frames to a receiving, device at a rate higher than the receiving device can absorb them. The rate of 'absorption' may be influenced by a variety of factors, one being the rate at which the receiving, device can forward packets or frames. A second factor is the traffic conditions on links from the receiving, device to other devices. A third factor may be the latency, for example inherent delays in processing in the receiving device and so on. It is therefore customary to monitor the occupancy of memory space allotted to a given port or a group of ports and on the production of a signal, indicating according to some selected criterion, usually termed 'watermark', that the memory is sufficiently full, a pause frame is sent by the device to the source of packets for that particular port or group of ports.

It should be understood at this point that a group of ports may be linked together by means of a trunk so as to increase the rate of transmission of packets over a particular link. Further, the choice of a watermark is influenced by latency in the system. For example, it is normally necessary to allow for a round-trip time, i.e. a time including the time for a pause frame to travel to the source device and for packets sent by the source to the receiver. For this reason the watermark usually denotes some proportion of the allotted memory space rather less than the maximum physical capacity of the relevant memory space.

As will be explained later, it is normal practice in current systems, particularly those conforming to IEEE Standard 802.3, to send pause frames which are organised to have a special globally assigned address, a relevant operation code and a pause time. A device conforming to that Standard will on receipt of such a pause frame on a particular link, cease sending packets over the link for the time specified in the pause frame. It is conventional that such a frame overrides the effect of a previous frame, so that the pause (if any) imposed on a source is determined only by the most recently received pause frame. It is also known to organise the sending of pause frames so that when the occupancy of the relevant memory space goes above an upper watermark a pause frame specifying a very long pause time is sent whereas when the occupancy of the memory falls below a lower watermark, a pause frame specifying a zero pause time is sent. The former will be termed herein an XOFF frame whereas the latter will be termed an XON frame, since the latter is interpreted by the source as allowing the sending of packets to recommence over the relevant link.

Owing to the need to accommodate wide variations in traffic conditions, systems sending an XOFF frame at an upper watermark and an XON frame at a lower watermark tend to require excessive memory.

It is therefore the general objection of the present invention to reduce the memory requirements in a system which employs pause frames for controlling the flow of packets over a duplex link.

SUMMARY OF THE INVENTION

The invention concerns the sending, when a buffer memory falls below a selected mark, of a periodic sequence of pause frames which impose on the source that is governed by those frames a duty cycle of alternating periods in which sending of packets by the source is allowed and prevented.

The periodic sequence of pause frames can be provided in a variety of ways. One is to send XOFF frames alternating with XON frames at a selected frequency. Another is to send pause frames which specify a pause time which is a fraction of a repetition period of the pause frames.

One benefit of such a scheme is that a device which can operate at a relatively low rate and/or have insufficient memory to be fully compatible with a source that operates at a much higher rate can limit the maximum rate of the source to a fraction of that much higher rate. Alternatively the device needs less memory to cope with a 'worst case' condition in which the source transmits at a high rate and the device empties the memory at a much lower rate.

Further features and objects of the invention will become apparent from the following description by way of example of a particular embodiment of the invention.

BRIEF DESCRIPTION OF THE DRAWINGS

FIG. 5 is a diagram of periodic pause frame generation applied to a low watermark of a buffer memory;

DETAILED DESCRIPTION OF PREFERRED EXAMPLES

Figure 1:
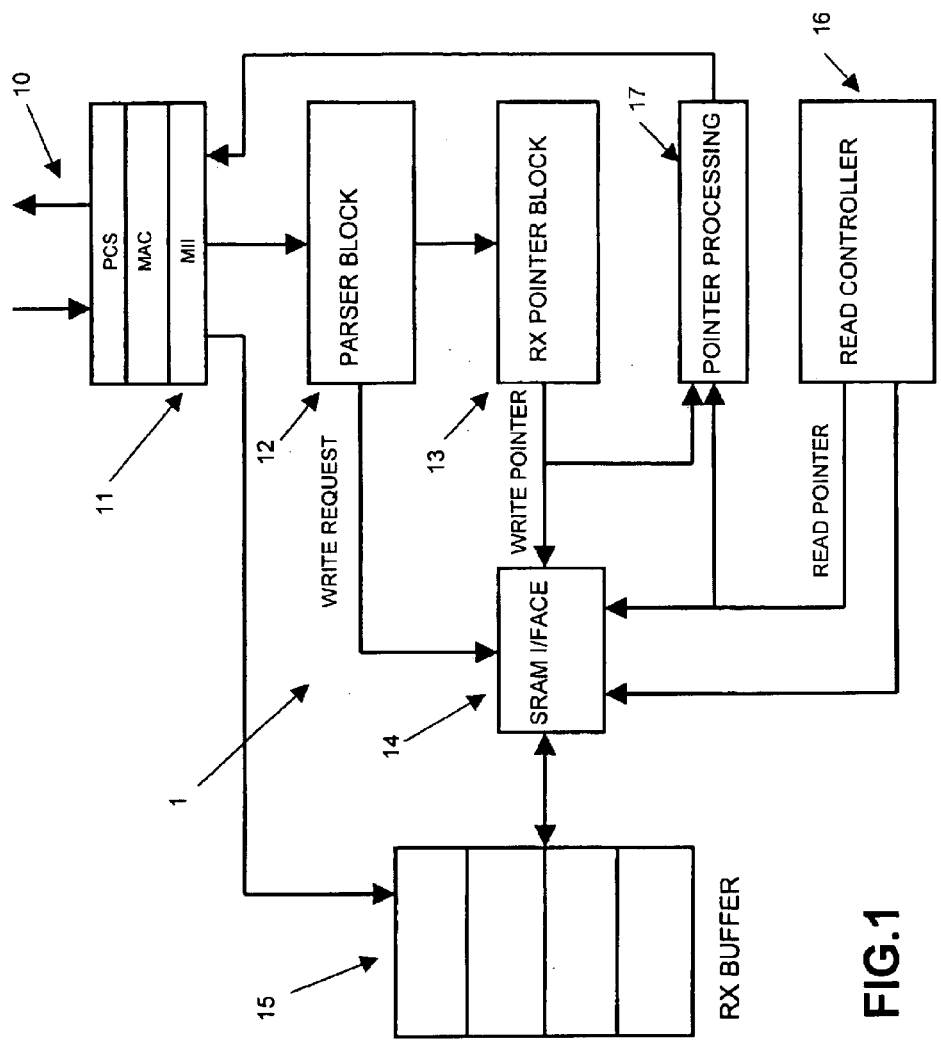
FIG. 1 illustrates by way of example the relevant parts of a network device which is arranged to receive 'Ethernet' packets and frames over a duplex link.

FIG. 1 illustrates by way of example only part of a network device for use in a packet-based data communication system. An example of such a device is a network switch, bridge, router or adapter which has a multiplicity of ports any one of which may be connected as one end of a communication link over some suitable transmission medium to another device. In normal circumstances some or all of the ports of such a device will be connected to other devices and may both send and receive data packets. For the sake of simplicity it will be presumed that the device shown in FIG. 1 is for use as one end of a duplex communication link 10 and a port 11 is connected to that link. Typically, the port 11 contains several 'layers', such as the physical connection sub-layer (PCS), the media access control layer (MAC) and the media independent interface (MII). For an explanation of these terms the reader is directed to the aforementioned Standard.

The port 11 may be connected to a parser block which reads for example addressed data from packets and controls by means of a pointer block 13 an interface 14 which determines where in a memory 15 a packet received by the port shall be stored. Typically the memory 15 has a memory space allotted to each of the ports. How this is organised is not important to the present invention. Data will be read out from the buffer by means of a read controller 16 driving a read pointer and a read request to the interface 14 which will control the buffer 15. In this example, the occupancy of the memory space available for packets received by port 11 will be determined by the respective read and write pointers obtainable from the RX pointer block 13 and the read controller 16. These pointers are employed by a processing block 17 for the initiation of flow control frames by port 11, the flow control frames being generated in the prescribed format and in a manner known per se by the port 11.

It is emphasised that the architecture shown in FIG. 1 is given only by way of example and, apart from the processing block 17, represents by way of example a large number of different types of network device. As will be apparent, the invention is applicable whatever the particular form of the memory provided (as is normal) that the degree of occupancy of the memory can be determined.

Figure 4:
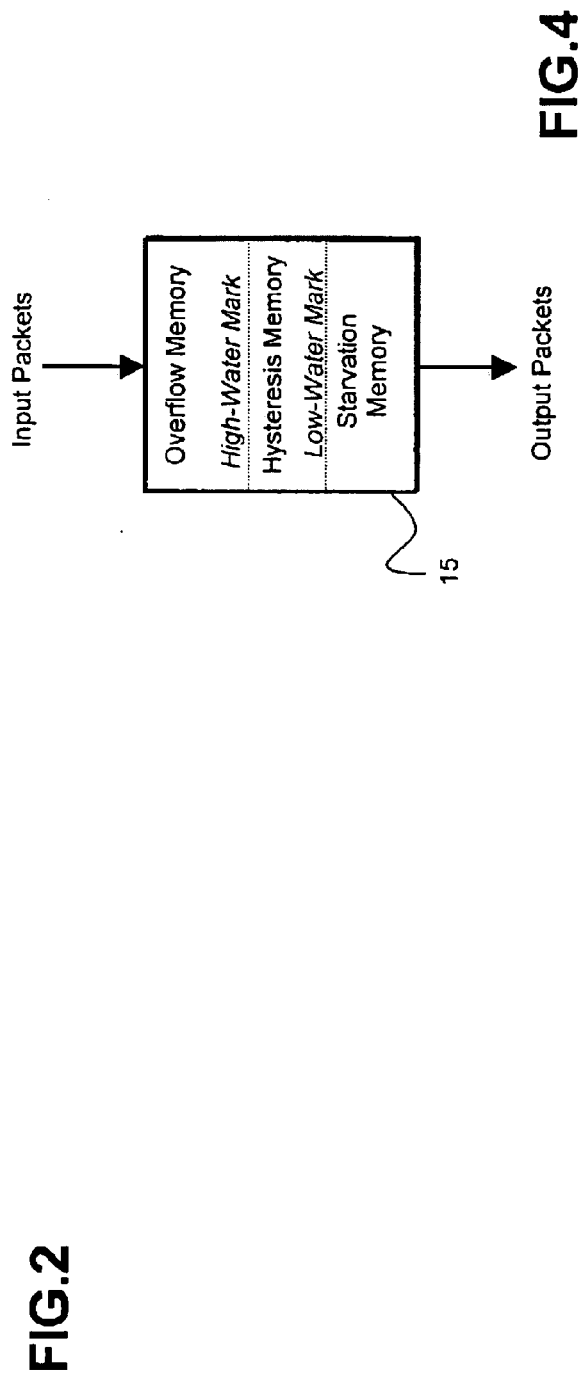
FIG. 4 is a diagram of a memory space within the device.

For example, FIG. 4 illustrates schematically a memory such as memory 15. The memory is coupled to receive packets and also to deliver packets. The memory will have, in general, two predetermined levels or marks. Although the memory may have a multiplicity of such marks, for the sake of simplicity only two will be considered, a 'high watermark' (HWM) and a 'low watermark' (LWM). It is customary to regard the memory space available over and above the high watermark as 'overflow' memory, the memory space which has to be occupied before the low watermark is reached as the 'starvation' memory and the memory capacity between the high watermark and the low watermark as the hysteresis memory.

The high watermark and low watermark merely denote predetermined respective proportions (which may be controllable or defined) of the respective available memory space. Whether the memory is above the HWM or below the LWM may be determined by comparing the difference between the read and write pointers with signals numerically representing the HWM and LWM.

Figure 2:
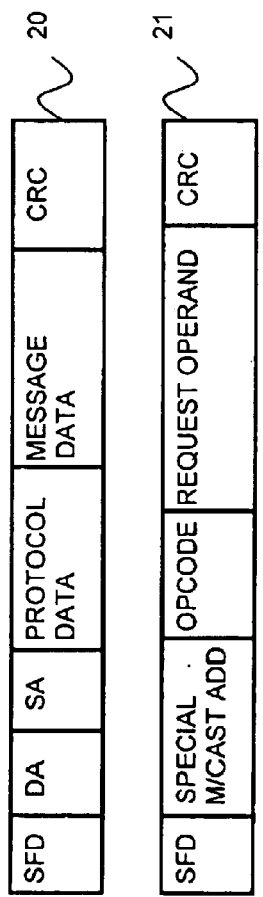
FIG. 2 illustrates packets and frames used by the link.

FIG. 2 illustrates an ordinary data packet which may be sent or received by the device shown in FIG. 1 and a frame 21 which is conventionally prescribed for use as a flow control frame.

The ordinary packets may consist of a start of frame delimiter (SFD), media access control address data usually constituted by a destination address (DA) and a source address (SA), protocol data. Which includes for example network address data, followed by message data and cyclic redundancy code (CRC) data. The usage of such packets is well established and will not be described in detail.

Pause frame 21 shown in FIG. 2 is a conventionally defined pause frame. In this embodiment of the invention it is intended to conform to the flow control frames described in IEEE Standard 802.3, 1998 Edition, annexes 31a and 31b, pages 12051–1215. As will be seen, the invention is applicable to analogous forms of pause frames.

The particular form of pause frame 21 described in the Standard includes in place of the media access control data as shown for packet 20, a 'globally assigned' multicast address which is specified (and reserved) for use in MAC pause frames to inhibit transmission of data frames from a data transmission entity in a full duplex mode. The pause frame includes a special operation code, known as the 'pause' op-code and a request operand which indicates the length of time for which inhibition of data frame transmission from the far end of the link is desired. The request operand specifies a 16-bit number (n) which prescribes a delay of $k^{-*}n$ bit times where k=512, and n can vary from zero to $2^{16}-1$.

As is described in the Standard, a data source which receives a pause frame of this nature is required to cease the sending of data packets for the pause time. How it does this is not important to the present invention and is in any event at the choice of the user provided that the operation conforms to the Standard. Obviously, similar considerations must apply for other forms of pause frames.

Typically however a source will include a timer which is set on receiving a pause frame and the source may recommence transmission of packets when the timer value reaches zero (i.e. times out). If the received pause frame indicates a zero time, the timer is immediately set to zero. If a new pause frame is received the timer is reset to the new pause time.

Accordingly, it is known practice to define two types of pause frames, of which one XON specifies zero time, and thus defines a transmission ON state. The other ('XOFF') may specify a pause time which is very long and therefore can effectively define an 'OFF' state. In the example given the maximum pause time corresponds to approximately 32 megabits. An XOFF frame may define this maximum time but need not. It is possible (though not desirable) for the XON pause time to be very small rather than zero.

Figure 3:
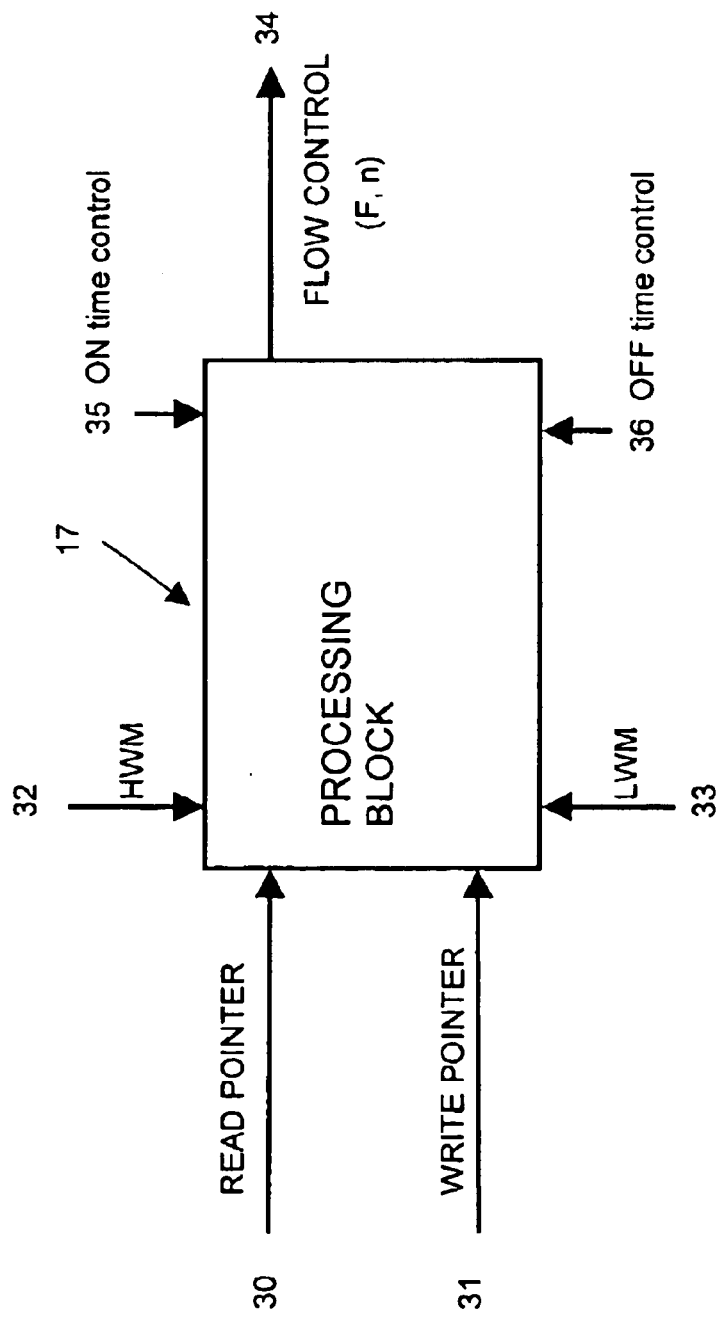
FIG. 3 is a diagram of a processing block used to implement the invention.

FIG. 3 illustrates schematically a processing block 17. It will receive on lines 30 and 31 the read and write pointers, to provide a measure of the state of fullness of the respective memory space, signals representing the HWM and LWM on lines 32 and 33 and will produce a flow control initiating signal on a line 34. It is a state machine which implements the process shown in FIG. 6. As will be apparent, in the preferred example the frequency of the pause frame sequence is fixed and so are the pause times, but for completeness means for setting the interval between the start of the XON frame and the start of the next XOFF frame is shown at 35 and means for setting the interval between the start of the XOFF frame and the start of the XON frame is shown at 36. These may be controlled by the network management process.

Known forms of processing blocks, such as shown for example in our earlier patent application Ser. No. 9905482.7 filed 11 Mar. 1999, include inputs defining a pause time (which may be dependent on the state of fullness of the memory) and other inputs which are not particularly relevant to the present invention.

Referring to FIG. 4, it is customary to send a pause frame with a very long pause (period defined in it (an XOFF frame) when the occupancy of the memory space 15 exceeds the high watermark and to send a pause frame defining substantially zero pause period (an XON frame) when the occupancy of the memory has fallen below the low watermark. It is preferable to separate the high watermark from the low watermark to provide what is termed the 'hysteresis' memory.

An algorithm in which an XOFF frame is sent when the high watermark is exceeded and an XON frame sent when the low watermark is reached will accomplish flow control but in practice requires a large amount of 'overflow' memory in the buffer above the capacity prescribed by the high watermark. The overflow memory required is influenced by the peak data rate and the time required between the sending of an XOFF frame by the receiving device and the time when data packets cease to arrive at the device. Typically, for a link operating with a peak rate of 10 gigabits per second, and being longer than for example 350 meters, the time taken is dominated by the round trip propagation delay of the link. For a 10 gigabit per second link of length 40 kilometers, at least 4 megabits of overflow memory would be required. This is a large memory for incorporation in an ASIC and any reduction would lead to at least a cost advantage, bearing in mind that an ASIC may be required for each of a large multiplicity of ports on a device.

Figure 6:
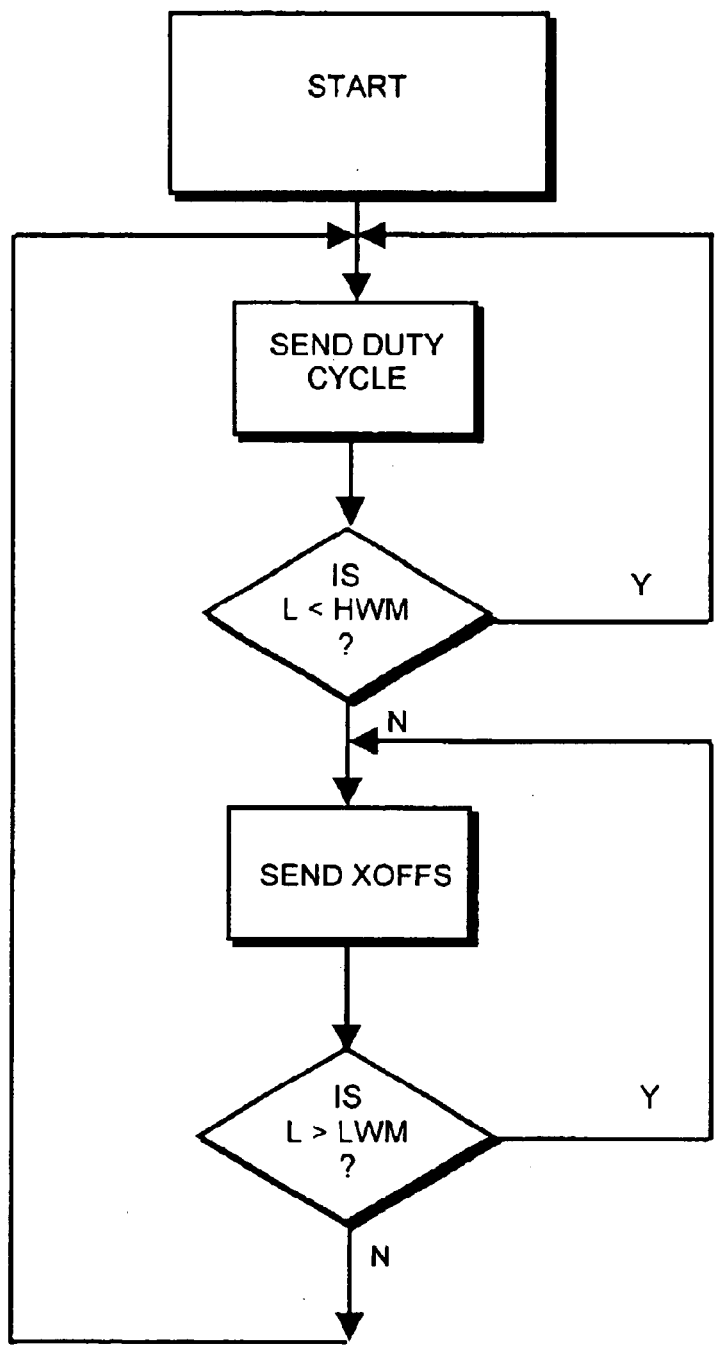
FIG. 6 illustrates a preferred process for generating pause frames.

A modified algorithm for sending pause packets is shown in FIG. 6 and may be understood in conjunction with FIG. 5.

FIG. 5 shows in its upper portion a graphical line 50 representing the occupancy of the memory space against time. The middle portion illustrates the pause status of the receiver, wherein a transition between XON and XOFF represents the sending of an XOFF control frame and the reverse transition represents the sending of an XON control frame. The lowermost portion of FIG. 5 represents the transmit status of the source, i.e. the effect on it of the pause control frames. This status corresponds to the pause status but is delayed relative to it by the time for propagation of the frames from receiver to source. For simplicity it is assumed that the source will whenever permitted transmit at its maximum data rate (e.g. 10 Gigabits per second) and that the receiver continually empties its buffer memory at its maximum data rate (e.g. 4 Gigabits per second) and that it is desirable to limit the data rate of the source to an average of about that of the receiver.

The processing unit repeatedly executes the process shown in FIG. 6 as often as suitable, for example at a rate equivalent to the rate at which packets are received.

The process is presumed (without loss of generality) to commence at a time when L (representing the occupancy of the memory) approaches the HWM. The duty cycle is commenced at this time.

When the occupancy of the memory space exceeds the high watermark, as shown by curve 50 at time t1, the device will send only XOFF frames on link 10 to the remote source device. After a time delay due to the propagation time for frames and packets on the link, the sending of packets by the source must cease (time t2). After the source/receiver propagation delay the reception of packets by the receiver ceases (at time t3). When the input buffer empties below the low watermark as shown by curve 50 at time t4, the device will send a periodic alternating sequence of XON and XOFF control frames The time period between the pause packets and the intervals between the sending of an XOFF control frame and an XON frame and vice versa may be different and may be set into the processing block by means of control inputs 35 and 36. These may be regarded as ON and OFF times (but should not be confused with the pause times defined by the frames).

At time t5 the first XON frame arrives at the source so that the source can transmit intermittently at the reduced data rate. By selecting the ON and OFF times the source's data rate can be reduced to any desired fraction of the maximum rate of the source.

At time t6 packets from the source again arrive at the receiver and curve 50 rises at the net rate (i.e. the incoming data rate less the rate at which packets are removed from the memory). At time t7 the contents are above the LWM but in this embodiment the duty cycle continues to time t8, which corresponds to time t1. At this point the alternating sequence ends and the receiver sends only XOFF frames as before. At time t9 the source receives only XOFF frames, as at time t2.

In this manner the remote source is effectively controlled so that it cannot send packets more quickly than D*(maximum data rate) where D is the duty cycle (i.e. the ON time divided by the sum of the ON and OFF times). Under these circumstances the overflow memory required by the receiver can be reduced to the similar proportion of the overflow memory required for ordinary flow control. Thus for example a 10 gigabit per second link which is 40 km long and subject to a 40% duty cycle will now only require 1.6 megabits of overflow memory.

Various modifications are possible. For example, although the alternating sequence of XON and XOFF flow control frames continues when the content of the memory exceeds the mark LWM (at time t6 shown) it could be stopped when the memory exceeded the low watermark. Further, the sequence may be constituted entirely by pause frames which prescribe a pause time which is less than their repetition period, so that the source reverts to its ON state because the pause timer times out substantially before the next pause frame is received. For example pause frames defining a pause time of 1 µs may be sent every 2 µs.

Further, although the preferred embodiments do not require any measurement of the net data rate of the memory (for example by measuring change of the difference between read and write pointers in unit time) such a measurement may be made and employed to control the duty cycle.

What is claimed is:

1. A network device which comprises:
   a port for receiving packets from a link;
   a memory coupled to said port for temporarily storing said packets;
   a memory controller operable to provide an indication when the occupancy of the memory is less than a first watermark; and
   a pause frame generator responsive to said indication for providing on said link a sequence of pause frames of predetermined repetition period, wherein said pause frames in the sequence define for a source of said packets alternating periods in which sending of packets on the link is alternately allowed and prevented.

2. A network device as in claim 1 wherein said pause frames comprise an alternating sequence of XOFF frames defining a very long cessation of the sending of packets and XON frames defining substantially zero cessation of the sending of packets.

3. A network device as in claim 1 wherein said pause frames comprise a sequence of pause frames each defining a pause time which is less than said predetermined repetition period.

4. A network device which comprises:
   a port for receiving packets from a link;
   a memory coupled to said port for temporarily storing said packets;

a memory controller operable to provide a first indication when the occupancy of the memory is less than a first watermark, and a second indication when the occupancy of said memory is above a selected watermark; and a pause frame generator responsive to said indication for providing on said link in response to said first indication a sequence of pause frames of predetermined repetition period, wherein said pause frames in the sequence define for a source of said packets alternating periods in which sending of packets on the link is alternately allowed and prevented, said pause frame generator being responsive to said second indication to stop said sequence of pause frames.

5. A network device as in claim 4 wherein said pause frames comprise an alternating sequence of XOFF frames defining a very long cessation of the sending of packets and XON frames defining substantially zero cessation of the sending of packets.

6. A network device as in claim 4 wherein said pause frames comprise a sequence of pause frames each defining a pause time which is less than said predetermined repetition period.

7. A network device as in claim 4 wherein said selected watermark denotes a greater level of occupancy than said first watermark.

8. A network device as in claim 4 wherein said selected watermark denotes the same level of occupancy as said first watermark.

9. A method for processing data packets at a network device, said method comprising:

receiving packets from a link;

temporarily storing said packets in a memory; and providing on said link a sequence of pause frames of predetermined repetition period in response to occupancy of the memory becoming less than a first watermark, wherein said pause frames in the sequence define for a source of said packets alternating periods in which sending of packets on the link is alternately allowed and prevented.

10. A method as in claim 9 wherein said pause frames comprise an alternating sequence of XOFF frames defining a very long cessation of the sending of packets and XON frames defining substantially zero cessation of the sending of packets.

11. A method as in claim 9 wherein said pause frames comprise a sequence of pause frames each defining a pause time which is less than said predetermined repetition period.

12. A method for processing data packets at a network device, said method comprising:

receiving packets from a link;

temporarily storing said packets in a memory;

providing on said link in response to occupancy of the memory becoming less than a first watermark a sequence of pause frames of predetermined repetition period, wherein said pause frames in the sequence define for a source of said packets alternating periods in which sending of packets on the link is alternately allowed and prevented; and stopping said sequence of pause frames in response to the occupancy of said memory exceeding a selected watermark.

13. A method as in claim 12 wherein said pause frames comprise an alternating sequence of XOFF frames defining a very long cessation of the sending of packets and XON frames defining substantially zero cessation of the sending of packets.

14. A method as in claim 12 wherein said pause frames comprise a sequence of pause frames each defining a pause time which is less than said predetermined repetition period.

15. A method as in claim 12 wherein said selected watermark denotes a greater level of occupancy than said first watermark.

16. A method as in claim 12 wherein said selected watermark denotes the same level of occupancy as said first watermark.

* * * * *